March 31, 1931.                H. KRATZER                1,798,208
POULTRY TROUGH
Filed June 21, 1929        2 Sheets-Sheet 2
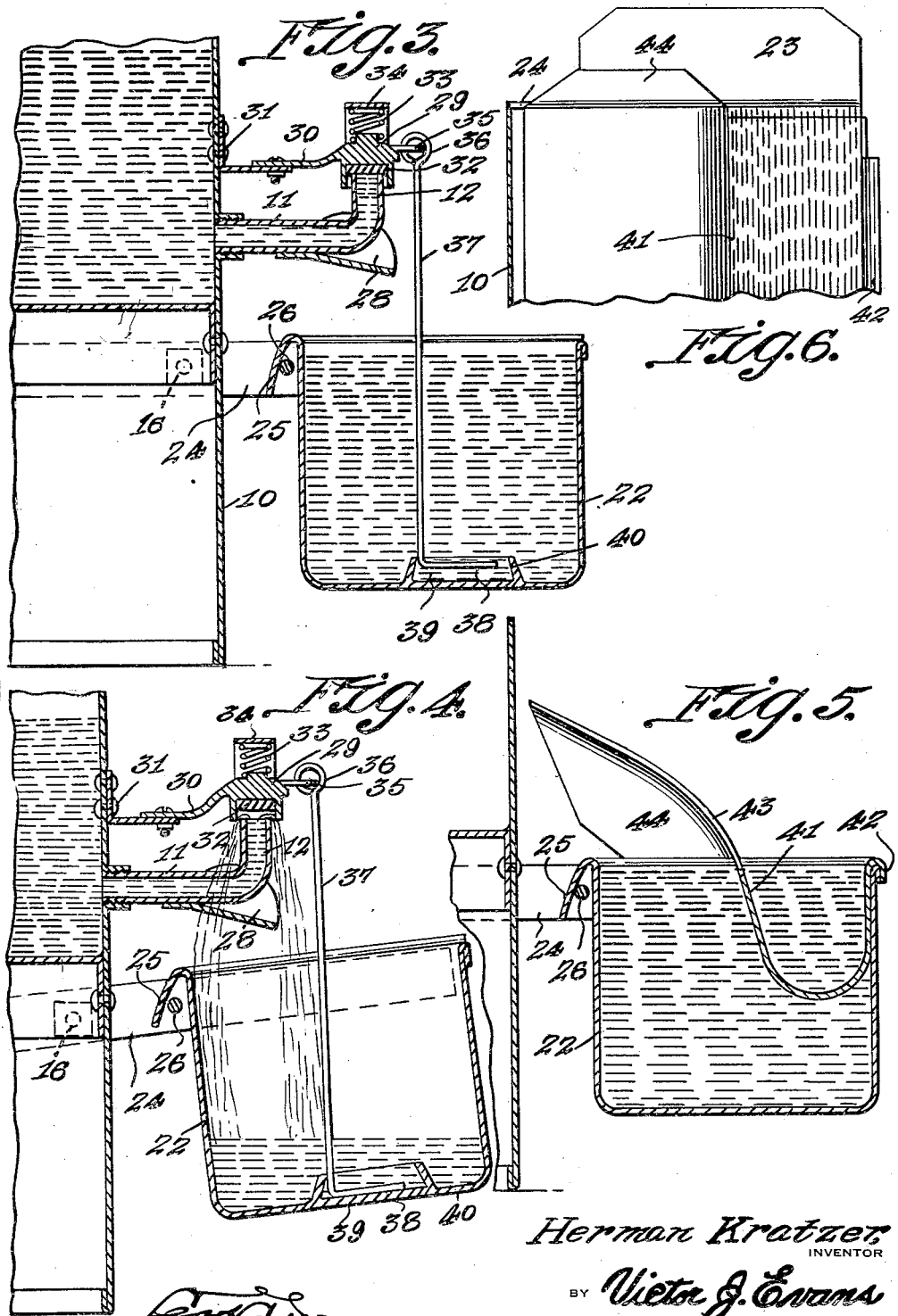
Herman Kratzer,
INVENTOR
BY Victor J. Evans
ATTORNEY Patented Mar. 31, 1931

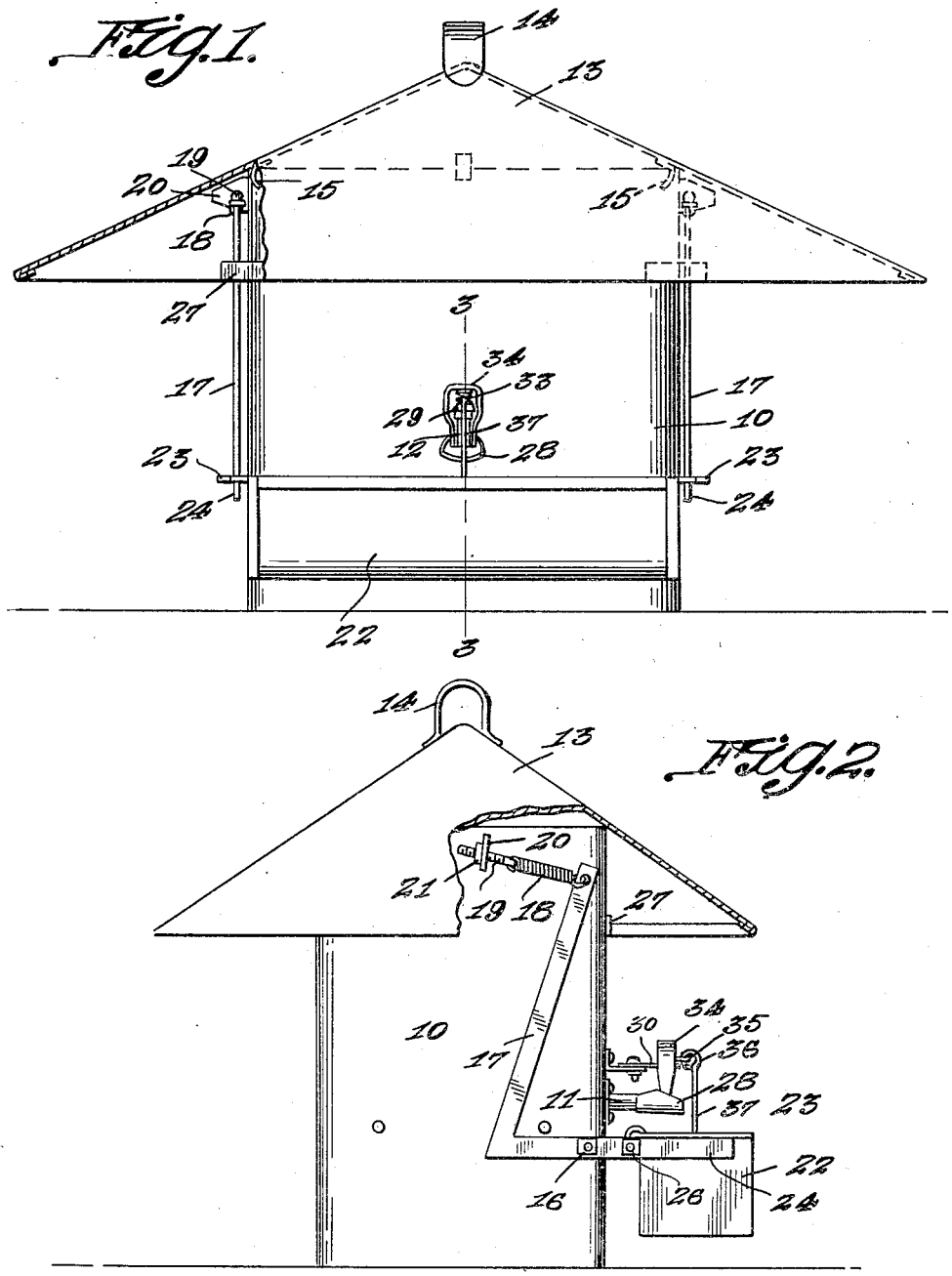

1,798,208

UNITED STATES PATENT OFFICE

HERMAN KRATZER, OF ELLSWORTH, KANSAS

POULTRY TROUGH

Application filed June 21, 1929. Serial No. 372,723.

This invention relates to improvements in watering troughs adapted to furnish a supply of clean water for poultry and animals, an object being to provide a sanitary drinking trough in which constant supply of clean fresh water may be maintained, the supply being governed by the amount of water within the trough.

Another object of the invention is the provision of novel means for mounting the trough for movement and for controlling the supply of water through such movement, together with means for protecting both the water supply and the water within the trough.

Another object of the invention is the provision of a novel form of valve and valve mounting, for controlling the water supply to the trough;

With the above and other objects in view, the invention further includes the following novel features and details of construction, to be hereinafter more fully described, illustrated in the accompanying drawings and pointed out in the appended claims.

In the drawings:—

Figure 1 is a front elevation of a watering trough constructed in accordance with the invention with a part of the cover shown in section.

Figure 2 is a like view of one end of the trough.

Figure 3 is an enlarged fragmentary sectional view taken substantially on the line 3—3 of Figure 1 with the trough filled.

Figure 4 is a similar view showing the trough elevated.

Figure 5 is a fragmentary sectional view showing the removable auxiliary trough in position for use.

Figure 6 is a fragmentary plan view of one end of the trough.

Referring to the drawings in detail wherein like characters of reference denote corresponding parts, the reference character 10 indicates a reservoir which is adapted to contain a supply of water and which is provided with a discharge spout 11 having an upturned extremity 12. The top of the reservoir is open and may be closed by a removable cover 13 which is provided with a handle or grip 14 for convenience in handling. This cover carries fingers 15 which extend within the top of the reservoir and act to prevent sliding movement of the cover.

Pivotally mounted upon opposite sides of the reservoir 10 as indicated at 16 are substantially L-shaped levers 17. The upper ends of these levers have connected thereto springs 18 and the latter are in turn connected to adjusting screws 19 which pass through openings provided in ears 20 which extend outwardly from the reservoir. Nuts 21 which are mounted upon the screws 19 provide for adjusting the screws to tension the spring 18.

The lower ends of the levers 17 extend outwardly beyond the front of the reservoir 10 and support a trough 22. This trough has extending from its opposite sides flanges 23 which rest upon the extended ends 24 of the levers 17. Extending from the rear edge of the trough 22 is a flange 25 which engages over a rod 26. This rod extends across the front of the reservoir and connects the levers 17. The trough 22 is thus supported by the extended ends 24 of the levers 17 and is held against sliding movement through the engagement of the flange 25 over the rod 26, while the latter acts as a spacing rod for the levers. Downward movement of the trough is limited by stops 27 which extend outwardly and laterally from the reservoir in the path of the upper ends of the levers 17.

By reference to the drawings it will be seen that the cover 13 extends over the edges of the reservoir for an appreciable distance and acts to protect water within the trough by preventing articles from falling therein. Where the trough is used for supplying water to poultry, it prevents animals from drinking at the trough and also prevents chickens and large birds from roosting upon the trough.

Water is supplied to the trough through the discharge spout 11 which extends over the trough, an auxiliary spout 28 extending outwardly beneath the spout 11 so as to direct the water into the trough.

The discharge of water from the spout is controlled by a valve 29 which is carried at the outer end of a resilient arm 30, the inner end of which is attached to the reservoir as shown at 31. This valve 29 is cup-shaped and is inverted over the upper end of the spout 11 and carries a compressible disk 32 which provides a watertight joint when the valve is closed. The tendency of the spring arm 30 is to force the valve 29 downward upon the spout. This action is assisted by a spring 33 which bears upon the valve 29 and against a yoke 34 whose ends are secured to the spout 11.

Extending from the valve 29 is an eye 35 which is engaged by an eye 36 at the upper end of a rod 37. This rod extends downwardly into the trough 22 and is provided with a rightangled extension 38. This extension is freely movable within a pocket 39 provided by an annular flange 40 which extends upwardly from the bottom of the trough.

When the trough is practically filled, the weight of the water will hold the trough downward so that the end 38 of the rod 37 will be spaced above the bottom of the trough. In this position, the valve 29 will be closed under the action of the spring 33 and the spring arm 30.

When water within the trough reaches a predetermined level the action of the spring 18 will move the arm 17 pivotally and raise the trough, whereupon the trough will engage the rod 37 and push the latter upward to open the valve as shown in Figure 4 of the drawings.

For the purpose of adapting the invention for the use of young chicks, there is provided an auxiliary trough 41. This trough has its forward edge provided with a flange 42 which is engageable over the front edge of the trough 22. A slot 43 extends centrally and transversely of the extended upper wall of the trough 42 for the passage of the rod 37. End flanges 44 engage the sides of the trough 22 and assist in holding the auxiliary trough in position.

The bottom 45 of the reservoir is spaced upwardly so as to provide a chamber 46. A lamp or other source of heat may be placed within this chamber for the purpose of heating the water within the reservoir. Suitable vent openings may be provided in the walls of the chamber 46 for the admission of air to promote combustion.

The invention is susceptible of various changes in its form, proportions and minor details of construction and the right is herein reserved to make such changes as properly fall within the scope of the appended claims.

Having described the invention what is claimed is:—

1. In a watering trough, a water reservoir, a trough mounted for upward movement, means to yieldingly resist downward movement of the trough under the weight of water therein, valve controlled means to supply water to the trough from the reservoir, means to normally close the valve, a rod having one end connected with the valve and its opposite end extending into the trough, and an upwardly disposed annular flange extending from the bottom of the trough to freely receive the lower end of the rod.

2. In a watering trough, a water reservoir, a substantially L-shaped spring influenced lever pivotally mounted at each side of the reservoir with the lower arms of the levers extending beyond the front of the reservoir, a rod extending across the front of the reservoir and connecting the arms, a trough positioned between said arms, flanges extending from the sides of the trough over said arms to support said trough, means extending from the rear of the trough and engaging over the rod to removably hold the trough in position, means to supply water to the trough from the reservoir, and means controlled by the weight of water within the trough to actuate the water supply means.

3. In a watering trough, a water reservoir, a substantially L-shaped spring influenced lever pivotally mounted at each side of the reservoir with the lower arms of the levers extending beyond the front of the reservoir, a rod extending across the front of the reservoir and connecting the arms, a trough positioned between said arms, flanges extending from the sides of the trough over said arms to support said trough, means extending from the rear of the trough and engaging over the rod to removably hold the trough in position, means to supply water to the trough from the reservoir, means controlled by the weight of water within the trough to actuate the water supply means, and a transversely curved member removably attached to the trough to cover the rear portion of the top of the latter and provide a relatively small auxiliary trough at the forward portion.

4. In a watering trough, a water reservoir, a trough mounted for upward movement, means to yieldingly resist downward movement of the trough under the weight of water therein, an upwardly disposed discharge spout extending from the reservoir over the trough to supply water to the latter, a spring arm secured to and extending from the reservoir, a valve carried at the outer end of the spring arm and engaging the discharge spout to close the latter and means carried by the valve and engaging the trough to force the valve to open position when the trough is elevated.

In testimony whereof I affix my signature.

HERMAN KRATZER.